J. McNAMEE.
Hold-Back.
No. 39,260.  Patented July 14, 1863.
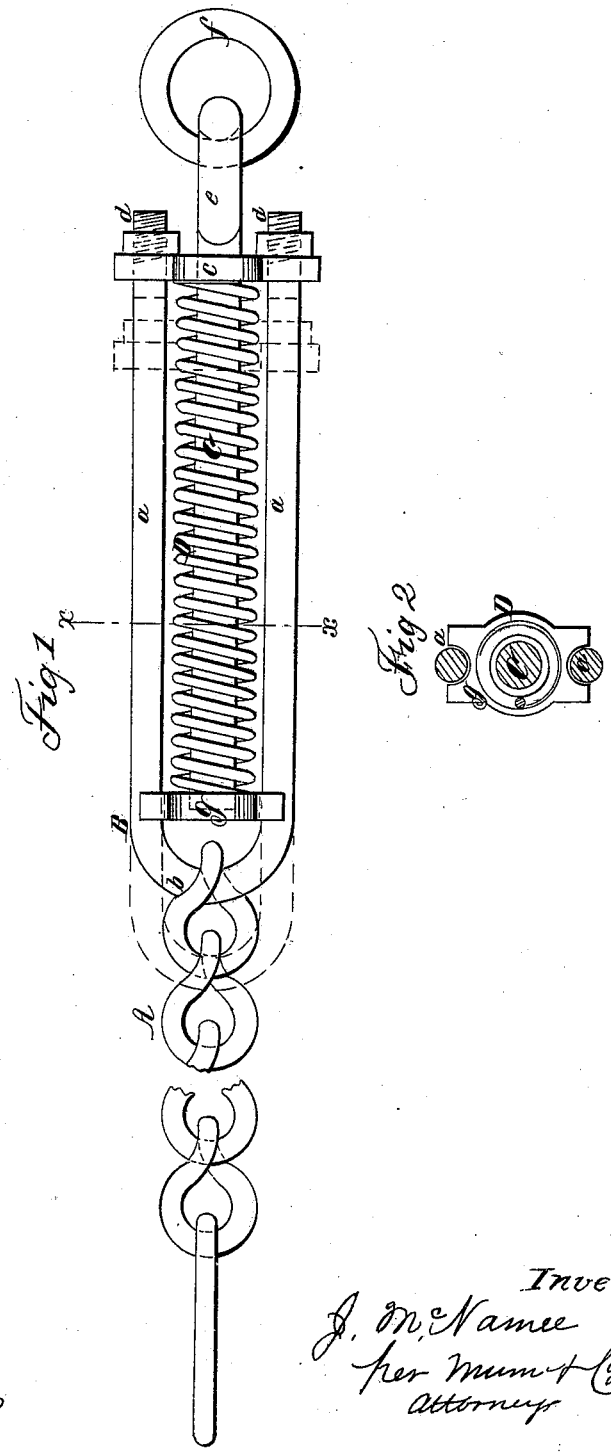

UNITED STATES PATENT OFFICE.

JAMES McNAMEE, OF EASTON, PENNSYLVANIA.

IMPROVEMENT IN HOLDBACKS FOR WAGONS.

Specification forming part of Letters Patent No. 39,260, dated July 14, 1863.

*To all whom it may concern:*

Be it known that I, J. McNAMEE, of Easton, in the county of Northampton and State of Pennsylvania, have invented a new and useful Improvement in Holdback Chains or Straps for Two-Horse Vehicles; and I do hereby declare that the following is a full, clear, and exact description of the same, reference being had to the accompanying drawings, making a part of this specification, in which—

Figure 1 is a side view of my invention; Fig. 2, a transverse section of the same, taken in the line $x\ x$, Fig. 2.

Similar letters of reference indicate corresponding parts in the two figures.

This invention relates to a new and useful improvement in holdback chains and straps, which are attached to the front end of the draft-pole of two-horse vehicles and to the collars of the horses, in order to hold back the vehicle in descending eminences, and also to back the vehicle when necessary. These holdback chains or straps, although indispensably necessary, are a source of great annoyance to the team, especially where a vehicle is passing over stony or uneven roads, as the vibrations of the draft-pole jerk the horses first in one direction and then in the other, and frequently so much so on bad roads as to almost throw them off their feet.

The object of this invention is to obviate this difficulty.

To enable those skilled in the art to fully understand and construct my invention, I will proceed to describe it.

A represents a portion of a holdback-chain, having a link, B, attached to one end of it. This link is formed of a metal rod, bent in staple form, so as to have two parallel sides, $a\ a$, and a rounded or semicircular end, $b$. The outer ends of the sides $a\ a$ are connected by a bar, $c$, which is perforated near its ends for the sides $a\ a$ to pass through loosely, and the ends of $a\ a$ are provided with screw-threads on which nuts $d$ are fitted, said nuts being on the outer side of the bar $c$, as shown clearly in Fig. 1.

C is a rod, which passes loosely through an opening at the center of the bar $c$, and has an eye, $e$, formed at its outer end, in which a ring, $f$, is fitted. The inner end of the rod C is attached firmly to a plate, $g$, the ends of which are notched or hollowed out to fit on the sides $a\ a$ of the link B. On the rod C there is placed a spiral spring, D, one end of which bears against the plate $g$, and the opposite end against the bar $c$, as shown clearly in Fig. 1. The spring D has a tendency to keep the plate $g$ and rod C forced or pressed inward, so that the eye $e$ of the rod C will be near the bar $c$ on the outer ends of the sides $a\ a$ of the link B.

The operation is as follows: The ring $f$, which passes through the eye $e$ of the rod C, is connected to the end of the draft-pole, and the free end of the chain A is connected to the lower part of the collar of the horse, there being a chain at each side of the draft-pole and one attached to each horse.

It will be seen from the above description that in case of any lateral movement of the draft-pole the springs D will be compressed and admit of the yielding of the rods C, so that all violent pulls and jerks will be avoided and the horses thereby greatly relieved, and in descending eminences the springs D will be fully compressed, so that the chains will hold back the vehicle, as usual, the springs expanding when the chains are relieved of the strain.

The invention may be applied at a small cost to either chains or straps. It has been practically tested and operated in the most efficient manner.

Having thus described my invention, what I claim as new, and desire to secure by Letters Patent, as a new article of manufacture, is—

The combination of the rod C, spring D, cross-bars $c\ g$, U-shaped link B, chain A, and ring $f$, when the said parts are constructed and arranged as herein specified, and the whole employed, as described, to arrest sudden lateral motions of the forward end of the tongue.

JAMES McNAMEE.

Witnesses:
 JNO. W. BELL,
 JOHN D. BOWERS.